United States Patent
Liang et al.

(10) Patent No.: US 9,754,327 B2
(45) Date of Patent: Sep. 5, 2017

(54) METHOD AND APPARATUS FOR CONFIGURING SOCIAL NETWORKING SITE SHARING FUNCTIONS

(75) Inventors: Mao Liang, Beijing (CN); Ning Li, Beijing (CN); Jin Huang, Beijing (CN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1171 days.

(21) Appl. No.: 13/556,793

(22) Filed: Jul. 24, 2012

(65) Prior Publication Data

US 2014/0032726 A1    Jan. 30, 2014

(51) Int. Cl.
  G06F 15/177     (2006.01)
  G06Q 50/00      (2012.01)
  H04L 29/08      (2006.01)
  G06F 21/41      (2013.01)
  G06F 9/50       (2006.01)

(52) U.S. Cl.
  CPC ............. G06Q 50/01 (2013.01); H04L 67/06 (2013.01); H04L 67/306 (2013.01); G06F 9/5077 (2013.01); G06F 21/41 (2013.01)

(58) Field of Classification Search
  CPC ....... G06F 21/41; G06F 9/5077; H04L 67/06; H04L 67/306; G06Q 50/01
  USPC ....................................................... 709/222
  See application file for complete search history.

(56) References Cited

U.S. PATENT DOCUMENTS

| 6,131,116 A * | 10/2000 | Riggins | G06F 9/54 709/203 |
| 2006/0007491 A1* | 1/2006 | Kanda | H04L 41/0803 358/1.16 |
| 2011/0138304 A1* | 6/2011 | Ungerman | G06F 3/0486 715/753 |
| 2011/0264772 A1* | 10/2011 | Krapf | G06F 8/61 709/220 |
| 2011/0283185 A1* | 11/2011 | Obasanjo | G06F 17/3089 715/243 |
| 2013/0074064 A1* | 3/2013 | Das | G06F 9/5077 718/1 |
| 2013/0097685 A1* | 4/2013 | Kennedy | G06F 17/30905 726/8 |
| 2013/0269017 A1* | 10/2013 | Patil | G06F 21/41 726/8 |
| 2013/0282481 A1* | 10/2013 | Kent | G06Q 30/0251 705/14.49 |
| 2013/0336137 A1* | 12/2013 | Cohen | H04L 43/04 370/252 |
| 2013/0346172 A1* | 12/2013 | Wu | G06Q 30/0214 705/14.16 |

* cited by examiner

*Primary Examiner* — Oleg Survillo
(74) *Attorney, Agent, or Firm* — Keller Jolley Preece

(57) ABSTRACT

A method and apparatus for configuring social networking site (SNS) sharing functions is disclosed. The method comprises downloading an interface configuration file and user information related to at least one SNS; processing and storing the interface configuration file and the user information; and transferring at least one content file to the at least one SNS based on the configuration file and user information.

20 Claims, 5 Drawing Sheets

METHOD AND APPARATUS FOR CONFIGURING SOCIAL NETWORKING SITE SHARING FUNCTIONS

BACKGROUND OF THE INVENTION

Field of the Invention

Embodiments of the present invention generally relate to content sharing on social networking sites (SNS's), and more particularly, to a method and apparatus for configuring SNS sharing functions.

Description of the Related Art

Internet users are using social networking sites (SNSs), such as Twitter, Facebook, Weibo, QQ, Renren, and the like to share files having content, such as images, videos, text, and the like (hereinafter referred to as "content") with relatives and friends.

Currently, a computer user may create image files, for example, using a mobile software application, such as ADOBE® IDEAS®. In order to share the image on an SNS, the user must save the image in a "photos" folder or library on the user's mobile device. Then, the user must launch an SNS application, such as a Facebook application, select the image from the photos area and share the image by uploading to the social networking site.

Other content sharing techniques enable users to directly share images from a desktop software application or a cloud based server to an SNS. However, in view of inevitable updates made by an SNS to its interface, it is required that the user download a corresponding update of the SNS application onto the user's computer and also update the photo-editing application's interface with the SNS, in order that direct image sharing from the photo-editing application to the SNS having an updated interface can remain operative. Ideally, a user should be able to share files from within a software application with an SNS without a requirement to update the SNS interface on the user's computer.

Therefore, there is a need for a method and apparatus for configuring SNS sharing functions in a manner that is not disruptive of a users experience with the SNS.

SUMMARY OF THE INVENTION

The present invention provides a method and apparatus for configuring social networking site (SNS) sharing functions. The method comprises downloading an interface configuration file and user information related to at least one SNS. The method then processes and stores the interface configuration file and the user information. The method then transfers at least one content file to the at least one SNS based on the interface configuration file and user information.

Figure 1:
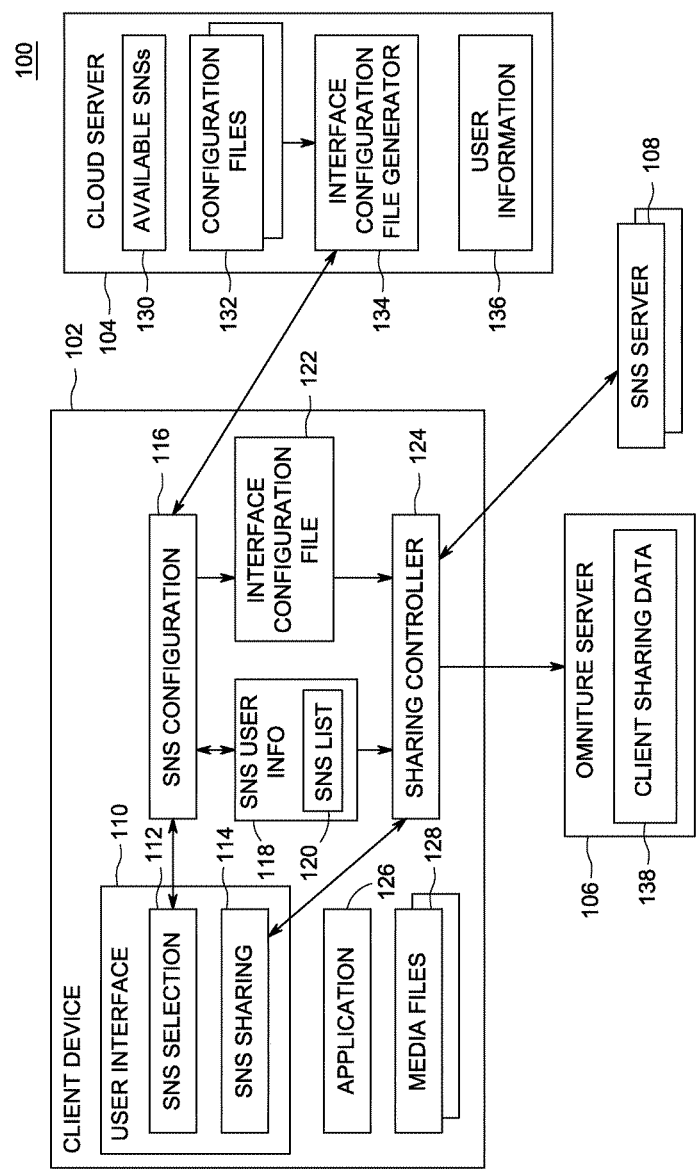
FIG. 1 depicts a block diagram of a system for configuring social networking site (SNS) sharing functions, according to one or more embodiments of the invention.

While the method and apparatus is described herein by way of example for several embodiments and illustrative drawings, those skilled in the art will recognize that the method and apparatus for configuring SNS sharing functions are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for configuring SNS sharing functions as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Additionally, as used herein, the word "content" refers generally to a file containing any media object or data, such as still or moving images, audio or text, and the word "share" refers generally to any transfer of files to (via upload) or from (via download) an SNS.

DETAILED DESCRIPTION OF EMBODIMENTS

Embodiments of the present invention comprise a method and apparatus for configuring social networking site (SNS) sharing functions. The embodiments provide a user of the tablet or mobile application (e.g., ADOBE® Ideas), desktop software application (e.g., ADOBE® Bridge) or cloud based services (e.g., ADOBE® Creative Cloud™) to select at least one SNS with which to transfer (share or retrieve or both) media and maintain SNS interface updates for the user on a cloud server without any requirement for further software installation. When a user launches such an application, e.g., the tablet or mobile application, desktop software application or cloud based service, a interface configuration file containing interface information for all SNS's with which the user has chosen to interact is downloaded from the cloud server. The interface configuration file defines interface parameters for interacting with each of the different SNSs. When a user would like to share content on an SNS, the user may initiate the sharing function from within the user's application. The method accesses the interface configuration file and formats the request to share based on the interface parameters defined in the interface configuration file. The method then accesses the interface configuration file in order to parse and respond to the response from the SNS. Hence, the user can seamlessly interface with an SNS without needing to take action in response to any changes to the SNS interface as all updates are stored on the cloud server and downloaded on to the user's computer when the user launches an application that interfaces with an SNS.

Various embodiments of an apparatus and method for configuring social networking site (SNS) sharing functions are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system for configuring social networking site (SNS) sharing functions, according to one or more embodiments of the invention. FIG. 1 depicts a system 100 of a client-server model for configuring social networking site (SNS) sharing functions.

The system 100 includes a client device 102, a cloud server 104, an omniture server, and at least one SNS server 106, operatively coupled to each other through a network (not shown) as is known to those skilled in the art.

The client device 102 is a type of computing device (e.g., a laptop, a desktop, a Personal Digital Assistant (PDA) and/or the like). The client device 102 comprises a user interface (UI) 110, an SNS configuration 116, SNS user information 118, an interface configuration file 122, a sharing controller 124, an application 126, and at least one media file 128. The user interface 110 comprises SNS selection 112 and SNS sharing 114. The SNS user information 118 comprises an SNS List 120.

The application 126 may include, but are not limited to, tablet applications, such as ADOBE® Ideas, desktop applications, such as ADOBE® Bridge, and cloud based services, such as ADOBE® CreativeCloud™, available from Adobe Systems Incorporated, San Jose, Calif., or any application capable of creating files including content that may be shared on an SNS.

The network (not shown) comprises a communication system that connects computers by wire, cable, fiber optic and/or wireless link facilitated by various types of well-known network elements, such as hubs, switches, routers, and the like. The network may employ various well-known protocols to communicate information amongst the network resources. For example, the network may be a part of the Internet or Intranet using various communications infrastructure, such as Ethernet, Wi-Fi, Wi-Max, General Packet Radio Service (GPRS), and the like.

The cloud server 104 is a type of computing device (e.g., a laptop, a desktop, a Personal Digital Assistant (PDA) and/or the like). The server 104 comprises a available SNSs 130, configuration files 132, an interface configuration file generator, and user information 136.

The omniture server 106 comprises client sharing data 136 that is sent from the client device 102. The client sharing data 136 may be used for various types of analysis pertaining to SNS sharing activities.

The SNS server 108 is a type of computing device (e.g., a laptop, a desktop, a Personal Digital Assistant (PDA) and/or the like). The SNS server 108 is a server for a social networking site, such as Twitter, Facebook, Weibo, QQ, Renren, and the like, where content, such as media files 128, may be shared. The SNS server 108 is representative of one or more SNS servers 108 with which a user may choose to interact.

In some embodiments, the user selects via the SNS selection 112 of the user interface (UI) 110, one or more SNS sites with which to interact. The sharing controller 124 stores the selected SNS sites in an SNS List 120 with the user information 118 on the client 102. The user information 118 comprises a login token that may be required by the SNS in order to access the SNS.

Thereafter, in one embodiment, when a user executes the application 126 on the client 102, the sharing controller 124 automatically sends a request to the server 104 requesting an interface configuration file 122 containing interface information for each SNS on the SNS list 120. In another embodiment, the user may initiate a request for the interface configuration file 122 via the UI 110. The interface configuration file generator 134 on the cloud server 104 receives the SNS List 120 in the request from the SNS configuration 116. The interface configuration file generator 134 creates the interface configuration file 122 and for each SNS on the SNS list 120, the interface configuration file generator 134 accesses the configuration file 132 for the given SNS and appends the contents of the accessed configuration file 132 to the end of the interface configuration file 122. When the configuration file 132 for each SNS on the SNS list 120 has been appended to the interface configuration file 122, the cloud server 104 sends the interface configuration file 122 containing interface information for each SNS on the SNS List and user information 136 from the cloud server 104 to the client device 102. The interface configuration file 122 defines a plurality of interface parameters for file sharing with at least one SNS 106. Interface parameters may include, but are not limited to, SNS capabilities, for example, image sharing, a definition for how to format a share request, a definition for how to parse a response from the SNS, and the like. In some embodiments, the interface configuration file 122 is an XML file that holds all the information for the SNSs with which a user chooses to interact. The user information 136 comprises access tokens needed for logging a user into the respective SNSs.

The sharing controller 124 stores the interface configuration file 122 and the user information 118. In some embodiments, as per the user request from within the SNS sharing 114 on the user interface 110, the application 126 initiates a file transfer process of the media file 128 based on the interface configuration file 122 and the user information 118. The media file 128 comprises content, such as images, videos, and/or text which the user wishes to share among relatives and/or friends through SNS. The media file 128 may be created using the software application 126.

In response to a request to share a media file 128 on an SNS 108, the sharing controller 124 formats the sharing request using the interface parameters specified in the interface configuration file 122 and sends it to the appropriate SNS 106. When retrieving a file from an SNS 106, the controller 125 is able to parse the contents of the media file 1128 based on information in the interface configuration file 122 that lists the possible parameters in the response from the SNS 108 and defines the corresponding methods to handle each parameter. Because all SNS information, including file sharing information, is maintained on the cloud server 104, a user need not take any action when changes are made to the SNS interface required for file sharing.

Figure 2:
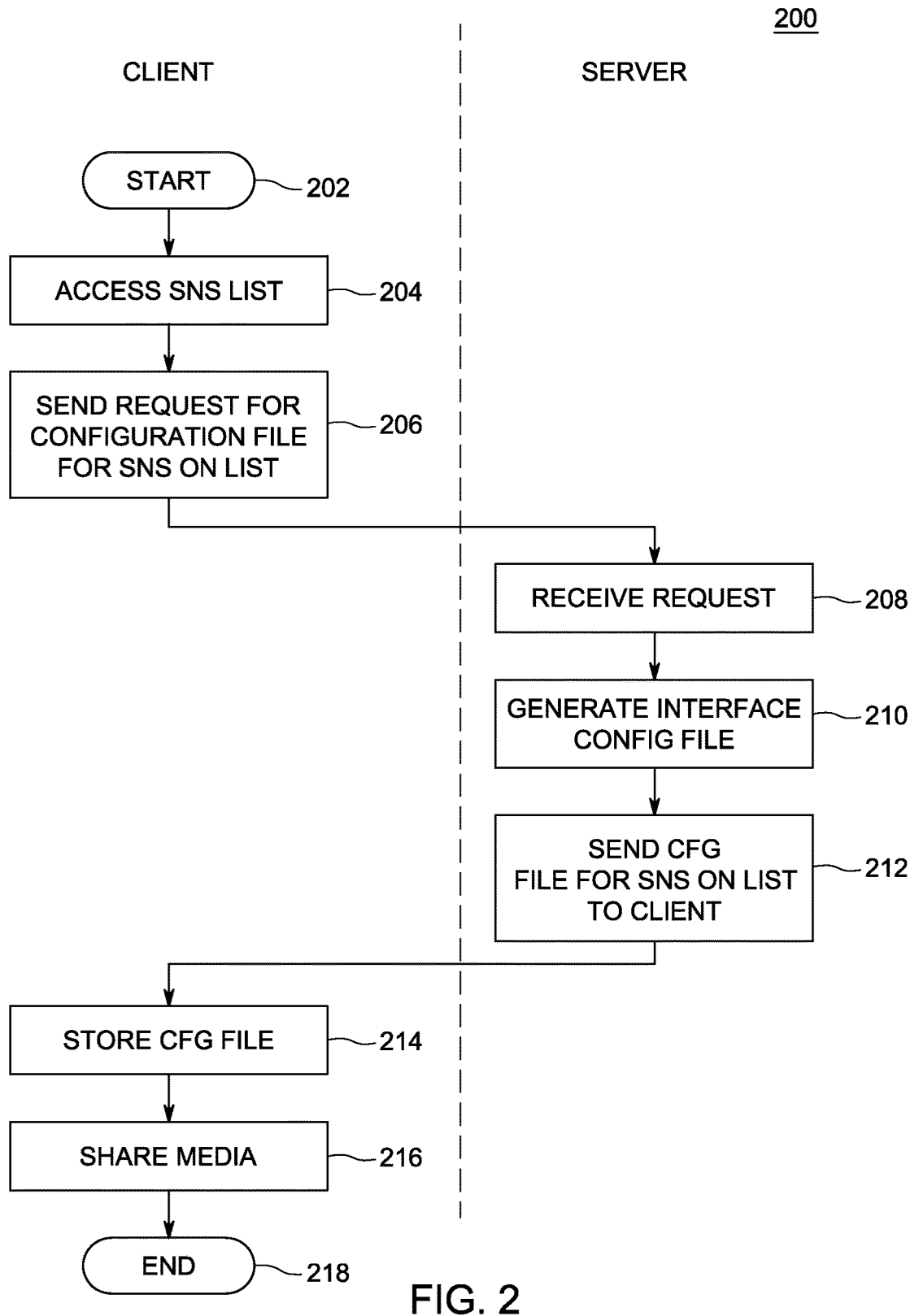
FIG. 2 depicts a flow diagram of a method for configuring SNS sharing functions as performed by the system 100 of FIG. 1, according to an embodiment of the invention.

FIG. 2 depicts a flow diagram of a method 200 for configuring social networking site (SNS) sharing functions, as performed by the system 100 of FIG. 1, according to an embodiment of the invention.

The method 200 starts at step 202 and proceeds to step 204. At step 204, the method 200 accesses an SNS list. The SNS list is created when a user specifies via a user interface at least one SNS with which to interact. The SNS list is a text file containing at least one SNS, such as Twitter, Facebook, Weibo, QQ, Renren, and the like. The method 200 proceeds to step 206. At step 206, the method 200 sends a request from the client to the server for an interface configuration file associated with each SNS on the SNS list. The method 200 proceeds to step 208.

At step 208, the method 200 receives the interface configuration file request from the client. The method 200 proceeds to step 210. At step 210, the method 200 generates an interface configuration file as described in further detail with respect to FIG. 3. The method 200 proceeds to step 212, where the method 200 sends the interface configuration file containing information for each SNS on the SNS list to the client. The method 200 proceeds to step 214.

At step 214, the method 200 stores the interface configuration file on the client device. The interface configuration file defines a plurality of interface parameters for file sharing for each SNS on the SNS list. The interface file is an XML file. For example, an interface configuration file may have interface parameters for different actions that may be performed between the client and an SNS. An interface configuration file may be, in part:

```
<provider name="Facebook">
    <capability>image</capability>
    <target name="login" protocol="OAuth" version="2.0">
        <task name="string_assign">
            <arg name="" value="fbconnect://success"/>
            <arg name="to" value="CALLBACK_SUCCESS"/>
        </task>
        <task name="string_assign">
            <arg name="" value="fbconnect://cancel"/>
            <arg name="to" value="CALLBACK_CANCEL"/>
        </task>
```

The <provider> tag is used to identify the SNS name, such as "Facebook" or "Twitter". The <capability> tag identifies the type of content that may be shared. For example, "image" means the SNS accepts image sharing, "title" means that title information may be shared, and "geoinfo" means geographical information may be shared.

The <target> tag identifies what action is performed. Each provider must have at least one target. Each target performs a specific action while sharing content to a SNS. For example, most SNSs require user authentication before sharing. Typically, a provider has two actions, namely, login and share. A target has several attributes, for example, name, protocol, and version. A target's name is unique within each provider. Protocol and version indicates the authentication method and version to the parser.

The <task> tag defines a predefined function that is called with the <arg> tag that provides the parameters of the function call. In the above example, the task "string_assign" assigns the string "fbconnect://success" to a temporary variable named "CALLBACK_SUCCESS" through the parameter name "to". This temporary variable can be accessed later by other tasks and targets.

The <request> tag assembles a complete HyperText Transfer Protocol (HTTP) request to call the SNS's application programming interface (API). Each request has a name attribute and should have a matched response with a same name attribute by default. The Universal Resource Locator (URL) attribute defines the main body of the request and the method attribute defines which HTTP method should be used to send out this request. The method may be "GET" or "POST", depending on the SNS API requirements The <response> tag is similar to the <request> tag. A response is returned by an SNS. The response contains the results of the request that was sent to an SNS.

Interface information for additional SNSs and the interface parameters specific to those SNSs may also be included in the interface configuration file.

Once the interface configuration file is stored on the client, file sharing and retrieving with a selected SNS of the SNS list is enabled. The method 200 proceeds to step 216, where the method 200 shares media as described in further detail with respect to FIG. 5 below. The method 200 proceeds to step 218 and ends.

Figure 3:
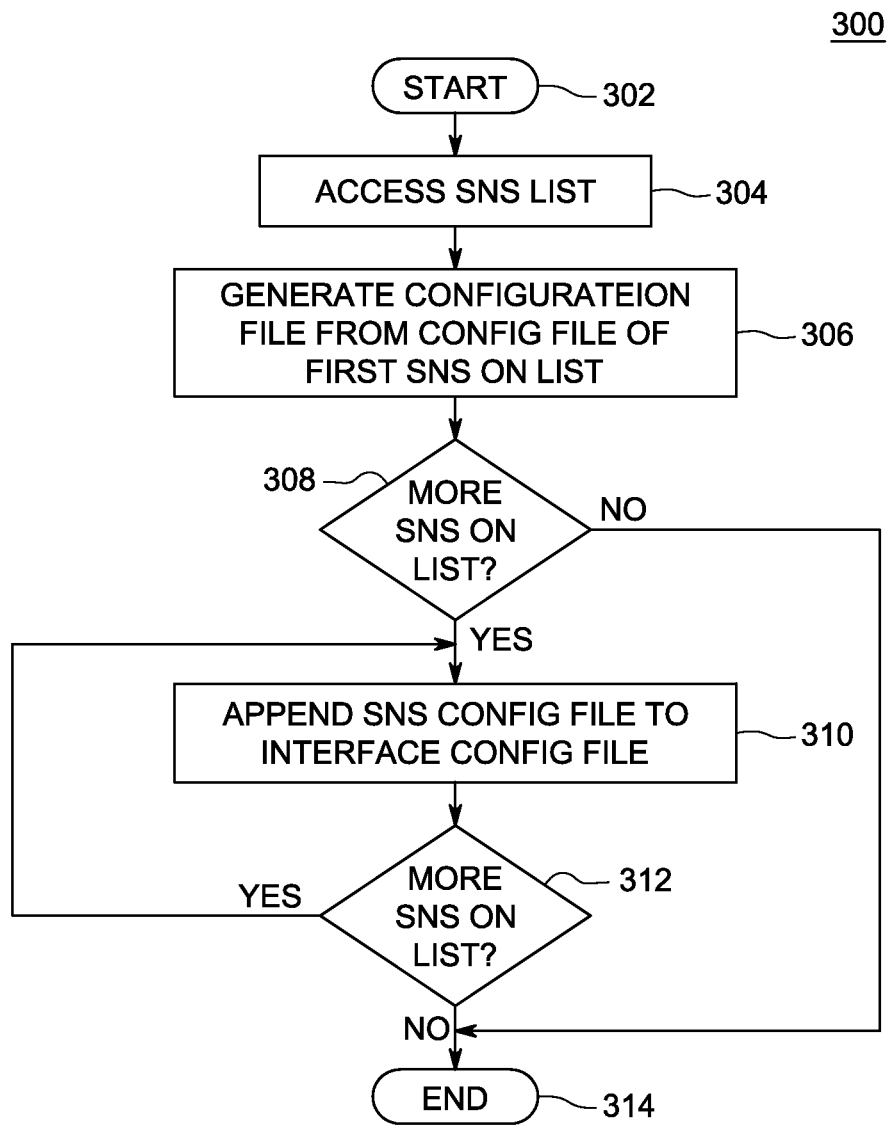
FIG. 3 depicts a flow diagram of a method for generating an interface configuration file as performed by the interface configuration file generator of FIG. 1, according to one or more embodiment of the invention.

FIG. 3 is a flow diagram of a method 300 for generating an interface configuration file as performed by the interface configuration file generator 134 of FIG. 1, according to one or more embodiment of the invention. The method 300 retrieves interface configuration information for each SNS with which a user would like to interact and creates an interface configuration file that will be utilized for media sharing with SNSs.

The method 300 starts at step 302 and proceeds to step 304. At step 304, the method 300 accesses an SNS list of all SNSs with which a user would like to interact. The method 300 proceeds to step 306, where the method 300 generates an interface configuration file. The method 300 looks at the first SNS on the SNS list and opens a configuration file for the first SNS. The configuration data in the opened configuration file is copied into the generated interface configuration file. The method 300 proceeds to step 308.

At step 308, the method 300 determines whether there are more SNSs on the SNS list. If the method 300 determines that there are no more SNSs on the SNS list, the method 300 proceeds to step 314. However, at step 308, if the method 300 determines there are more SNSs on the SNS list, the method 300 proceeds to step 310, where the method 300 opens the configuration file for the SNS and appends the contents of the configuration file for the SNS onto the end of the generated interface configuration file. The method 300 proceeds to step 312, where the method 300 determines whether there are more SNSs on the SNS list. If the method 300 determines that there are more SNSs on the SNS list, the method 300 proceeds to step 310, and the method 300 iterates until a configuration file for each SNS on the SNS list is appended to the generated interface configuration file. However, if at step 312, the method 300 determines there are no more SNSs on the SNS list, the method 300 proceeds to step 314 and ends.

Figure 4:
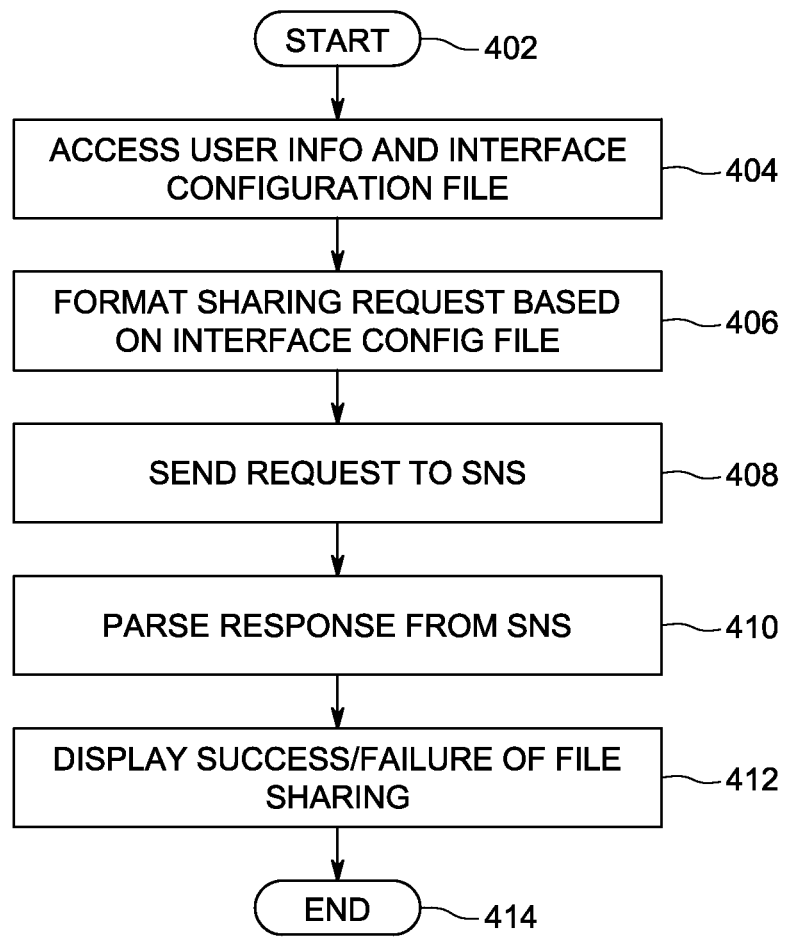
FIG. 4 depicts a flow diagram of a method for sharing media with an SNS as performed by the sharing controller of FIG. 1, according to one or more embodiments of the invention.

FIG. 4 depicts a flow diagram of a method 400 for sharing media with an SNS as performed by the sharing controller 124 of FIG. 1, according to one or more embodiments of the invention. The method 400 accesses an interface configuration file and formats a sharing request with an SNS. The method 400 also parses a response that is received from the SNS.

The method 400 starts at step 402 and proceeds to step 404. At step 404, the method 400 accesses user information and an interface configuration file. The user information and the interface configuration file contain information that is required to format at least one sharing request with an SNS.

The method 400 proceeds to step 406, where the method 400 formats at least one sharing request using the interface configuration file 400 accesses the user information in order to retrieve user authorization information associated with a selected SNS. The method 400 accesses the interface configuration file and formats the sharing request based on the parameters specified in the interface configuration file. The relevant portion of the interface configuration file for sharing a media file may be:

```
<target name="share">
        <task name="system_time_in_secs"/>
        <if>
            <cond>
                <and>
                    <test left="${OAUTH_TOKEN}" operator="neq" right="S##null"/>
                    <or>
                        <test left="${OAUTH_TOKEN_EXPIRES}" operator="gt" right="I##${SYSTEM_TIME_IN_SECS}"/>
                        <test left="${OAUTH_TOKEN_EXPIRES}" operator="eq" right="I##0"/>
                    </or>
                </and>
            </cond>
            <then/>
            <else>
                <then name="return" value="true">
                <task name="login">
                    <arg name="" value="Facebook"/>
                </task>
            </then>
        </else>
    </if>
    <request name="share" url="https://graph.facebook.com/me/photos" method="POST">
        <header name="Connection" value="Keep-Alive"/>
        <param name="format" value="jason"/>
        <param name="sdk" value="ios"/>
        <param name="sdk_version" value="2"/>
        <param name="access_token" value="${OAUTH_TOKEN}"/>
        <param name="message" value="${CAPTION}" encode="true"/>
        <param name="source" value="${MEDIA}" type="[B"/>
    </request>
```

The interface configuration file defines a task, specifically, <task name="system_time_in_secs"/>, using system time that will timeout the request if the SNS response time is too slow. If the request does not timeout, the interface configuration file defines the next step to be <task name=login>. When login is complete, the <request name="share" url=https://graph.facebook.com/me/photos method="POST"> defines arguments that are to be sent to the SNS.

The method 400 proceeds to step 408, where the method 400 sends the request to the SNS, then sends the sharing request to the SNS. In some embodiments, the method 400 formats and sends a sharing request to each SNS on the SNS list. In other embodiments, the method 400 sends a sharing request to a selected group of SNSs on the SNS list. The method 400 proceeds to step 410.

At step 410, the method 400 parses a response from the SNS and uses the parameters in the interface configuration file to know how to handle the response. For example, the portion of the interface configuration file describing how to handle the response may be:

```
<response name="share" format="json">
        <param name="id" mapped="MEDIA_ID_RETURNED" decode="true"/>
        <param name="error:message" mapped="ERROR_MESSAGE" decode="true"/>
        <param name="error:type" mapped="ERROR_TYPE" decode="true"/>
        <if>
            <cond>
                <and>
                    <test left="${ERROR_MESSAGE}" operator="eq" right="S##null"/>
                    <test left="${ERROR_TYPE}" operator="eq" right="S##null"/>
                </and>
            </cond>
            <then/>
            <else>
                <then name="return" value="false"/>
            </else>
        </if>
    </response>
</target>
</provider>
```

The <response name="share" format="json"> provides parameters for the method 400 to know whether the share request was successful.

The method 400 proceeds to step 412, where the method 400 may optionally display a success or failure message in response to the media sharing. The method 400 proceeds to step 414 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 5:
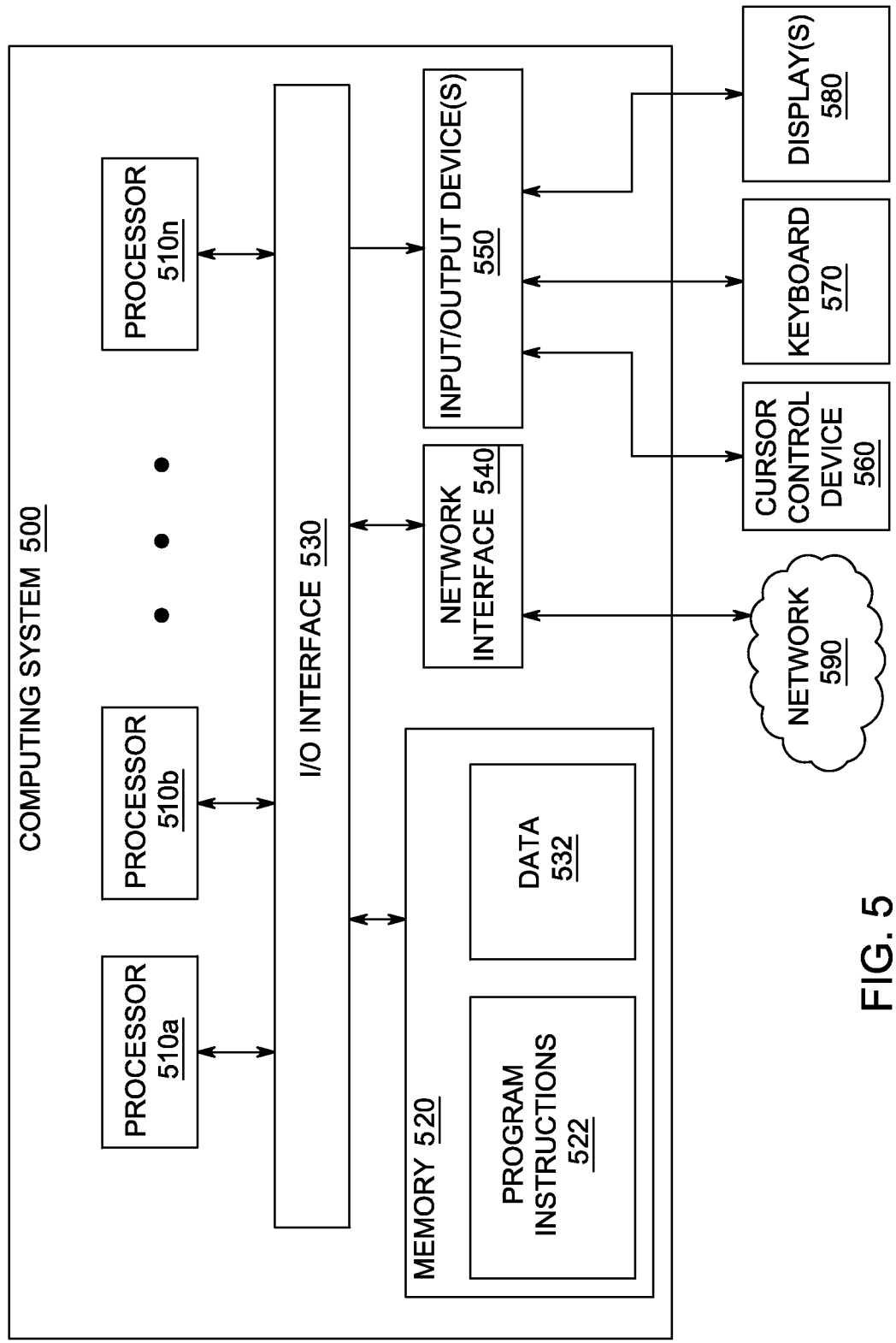
FIG. 5 depicts a computer system that can be utilized in various embodiments of the present invention, according to one or more embodiments of the invention.

FIG. 5 depicts a computer system that can be utilized in various embodiments of the present invention, according to one or more embodiments.

Various embodiments of method and apparatus for configuring social networking site (SNS) sharing functions, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 200, 300, and 400, as processor-executable executable program instructions 522 (e.g., program instructions executable by processor(s) 510) in various embodiments.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touch pads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the method described above, such as the methods illustrated by the flowcharts of FIG. 2, FIG. 3, and FIG. 4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for configuring social networking site sharing functions comprising:
   providing a list of social networking sites;
   receiving an indication of a user selection of a plurality of social networking sites from the list of social networking sites;
   downloading, via a computer network, a configuration file and user information related to the selected social networking sites, wherein the configuration file comprises a plurality of interface parameters that define how to form share requests for the plurality of social networking sites, and the plurality of interface parameters define protocols for file sharing with the plurality of social networking sites;

processing and storing the configuration file and the user information;

forming share requests corresponding to at least two social networking sites of the plurality of social networking sites utilizing the user information and at least two interface parameters of the plurality of interface parameters, wherein the share requests comprise a request to share a content file via the at least two social networking sites; and transferring, via the computer network, the share requests and the content file to the at least two social networking sites such that the at least two social networking sites share the content file with other users of the at least two social networking sites.

2. The method of claim 1, further comprising:

in response to modification of at least one social networking site of the selected social networking sites and a subsequent launch of a software application, downloading an updated configuration file comprising updated interface parameters that define how to form share requests for the modified at least one social networking site.

3. The method of claim 1, wherein the configuration file is downloaded automatically upon launch of a software application.

4. The method of claim 1, further comprising:

receiving responses from the at least two social networking sites; and parsing the responses from the at least two social networking sites based on the at least two interface parameters.

5. The method of claim 4, further comprising responding to the responses from the at least two social networking sites based on the at least two interface parameters.

6. The method of claim 1, wherein the user information comprises authorization information for accessing the social networking sites.

7. The method of claim 1, wherein the plurality of interface parameters define application programming interface calls for transferring the content file to the social networking site.

8. A system comprising:

at least one processor; and at least one non-transitory computer-readable storage medium storing instructions thereon that, when executed by the at least one processor, cause the system to:

provide a list of social networking sites;

receive an indication of a user selection of a plurality of social networking sites from the list of social networking sites;

download, via a computer network, a configuration file and user information related to the selected social networking sites, wherein the configuration file comprises a plurality of interface parameters that define how to form share requests for the plurality of social networking sites and the plurality of interface parameters define protocols for file sharing with the plurality of social networking sites;

create a content file;

form share requests corresponding to at least two social networking sites of the plurality of social networking sites utilizing the user information and at least two parameters of the plurality of interface parameters, wherein the share request comprises a request to share the content file via the at least two social networking sites; and transfer, via the computer network, the share requests and the content file to the at least two social networking sites such that the at least two social networking sites share the content file with other users of the at least two social networking sites.

9. The system of claim 8, further comprising instructions that, when executed by the at least one processor, cause the system to, in response to modification of at least one social networking site of the selected social networking sites and a subsequent launch of a software application, download an updated configuration file comprising updated interface parameters that define how to form share requests for the modified at least one social networking site.

10. The system of claim 8, further comprising instructions that, when executed by the at least one processor, cause the system to parse and store the configuration file and the user information.

11. The system of claim 8, wherein the user information comprises authorization information for accessing the selected social networking sites.

12. The system of claim 8, further comprising instructions that, when executed by the at least one processor, cause the system to:

receive responses from the at least two social networking sites; and parse the responses from the at least two social networking sites based on the at least two interface parameters.

13. The system of claim 8, wherein the plurality of interface parameters define application programming interface calls for transferring the content file to the social networking site.

14. A non-transitory computer readable medium that stores computer instructions that, when executed by at least one processor cause the at least one processor to perform steps of configuring social networking site sharing functions comprising:

providing a list of social networking sites;

receiving an indication of a user selection of a plurality of social networking sites from the list of social networking sites;

downloading, via a computer network, a configuration file and user information related to the selected social networking sites, wherein the configuration file comprises a plurality of interface parameters that define how to form share requests for the plurality of social networking sites;

processing and storing the configuration file and user information;

forming a share request corresponding to a social networking site of the plurality of social networking sites utilizing the user information and at least one of the plurality of interface parameters, wherein the share requests comprise a request to share a content file via the social networking site;

transferring, via the computer network, the share request and the content file to the social networking site such that the social networking site shares the content file with other users of the social networking site; and in response to modification of at least one social networking site of the selected social networking sites and a subsequent launch of a software application, downloading an updated configuration file comprising updated interface parameters that define how to form share requests for the modified at least one social networking site.

15. The computer readable medium of claim 14, wherein the plurality of interface parameters further define protocols for file sharing with the selected social networking sites.

16. The computer readable medium of claim 14, wherein the configuration file is downloaded automatically upon launch of the software application.

17. The computer readable medium of claim 14, further comprising computer instructions that, when executed by the at least one processor, cause the at least one processor to further perform the steps of:
receiving a response from the social networking site; and
parsing the response from the social networking site based on the at least one of the plurality of interface parameters.

18. The computer readable medium of claim 17, further comprising computer instructions that, when executed by the at least one processor, cause the at least one processor to further perform the steps of: responding to the response from the social networking site based on the at least one of the plurality of interface parameters.

19. The computer readable medium of claim 14, wherein the user information comprises authorization information for accessing the selected social networking sites.

20. The computer readable medium of claim 14, wherein the plurality of interface parameters define application programming interface calls for transferring the content file to the social networking site.

* * * * *